US012679112B2

(12) United States Patent
Murayama et al.

(10) Patent No.: US 12,679,112 B2
(45) Date of Patent: Jul. 14, 2026

(54) ACTIVE ENERGY EMISSION DEVICE

(71) Applicant: HAMAMATSU PHOTONICS K.K., Hamamatsu (JP)

(72) Inventors: Kyoichi Murayama, Hamamatsu (JP); Keita Umeno, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 419 days.

(21) Appl. No.: 18/268,442

(22) PCT Filed: May 26, 2021

(86) PCT No.: PCT/JP2021/020056
§ 371 (c)(1),
(2) Date: Jun. 20, 2023

(87) PCT Pub. No.: WO2022/137597
PCT Pub. Date: Jun. 30, 2022

(65) Prior Publication Data
US 2024/0066893 A1 Feb. 29, 2024

(30) Foreign Application Priority Data
Dec. 24, 2020 (JP) ................................ 2020-215355

(51) Int. Cl.
*B41J 11/00* (2006.01)

(52) U.S. Cl.
CPC .... *B41J 11/00218* (2021.01); *B41J 11/00214* (2021.01)

(58) Field of Classification Search
CPC . B41J 11/002; B41J 11/0021; B41J 11/00214; B41J 11/00216; B41J 11/00218;
(Continued)

(56) References Cited

U.S. PATENT DOCUMENTS 6,550,905 B1 * 4/2003 Deckers ............... C09D 11/101 347/100
6,646,278 B1 * 11/2003 Schwarz ................ B05D 3/067 250/504 R (Continued)

FOREIGN PATENT DOCUMENTS

EP 1448729 B1 3/2005
JP 2000-009900 A 1/2000

(Continued)

OTHER PUBLICATIONS

TW 201702517 A machine translation (Year: 2025).*
International Preliminary Report on Patentability mailed Jul. 6, 2023 for PCT/JP2021/020056.

*Primary Examiner* — Stephen D Meier
*Assistant Examiner* — Thomas Ray Knief
(74) *Attorney, Agent, or Firm* — Faegre Drinker Biddle & Reath LLP

(57) ABSTRACT

An active energy irradiation device includes: a plurality of active energy irradiation units; a housing that houses the active energy irradiation units; an exhaust unit that is provided in the housing, and that discharges air to an outside of the housing; and an inert gas suction unit that suctions an inert gas outside the housing, and that allows the inert gas to flow into the housing, wherein an air flow path allowing the air to flow through, and an inert gas flow path allowing the inert gas to flow through are provided inside the housing, the air flow path and the inert gas flow path merge with each other, and the exhaust unit exhausts the inert gas together with the air.

11 Claims, 15 Drawing Sheets

(58) Field of Classification Search
CPC ............ B41J 29/377; B29C 2035/0827; B29C 2035/0822; B29C 2035/0838; B29C 2035/0833; B29C 2035/0844; B29C 2035/085; B29C 2035/0855; B29C 2035/0866; B29C 2035/0872; B29C 2035/0877; F21V 29/51; F21V 29/52
USPC .......................................................... 347/102
See application file for complete search history.

(56) References Cited

U.S. PATENT DOCUMENTS

| | | | | |
|---|---|---|---|---|
| 2013/0182436 | A1* | 7/2013 | Payne | F21V 29/677 362/249.01 |
| 2016/0031218 | A1* | 2/2016 | Ishida | B41J 2/1714 347/34 |
| 2019/0263145 | A1* | 8/2019 | Rrahimi | B41F 23/0409 |

FOREIGN PATENT DOCUMENTS

| | | | | |
|---|---|---|---|---|
| JP | 2002-043268 | A | 2/2002 | |
| JP | 2003-285424 | A | 10/2003 | |
| JP | 2008-186606 | A | 8/2008 | |
| JP | 2008-221651 | A | 9/2008 | |
| JP | 2010-280170 | A | 12/2010 | |
| JP | 2011-153611 | A | 8/2011 | |
| JP | 2014-210430 | A | 11/2014 | |
| JP | 2015-149415 | A | 8/2015 | |
| JP | 2016-034702 | A | 3/2016 | |
| JP | 2017-064985 | A | 4/2017 | |
| JP | 2021-035759 | A | 3/2021 | |
| TW | 201702517 | A * | 1/2017 | B41J 11/00214 |
| WO | WO-2020/067158 | A1 | 4/2020 | |

* cited by examiner (a)

(b)

ACTIVE ENERGY EMISSION DEVICE

TECHNICAL FIELD

The present disclosure relates to an active energy irradiation device.

BACKGROUND ART

In the related art, an active energy irradiation device has been known that includes a plurality of active energy irradiation units and a housing that houses the active energy irradiation units. As this type of technique, for example, Patent Literature 1 describes an inkjet recording device including a light irradiation device that performs irradiation with light, and an inert gas supply device that creates a low-oxygen concentration atmosphere in the vicinity of the light irradiation device. In the device described in Patent Literature 1, the light irradiation device has a suction hole, and an inert gas discharge device separate from the light irradiation device suctions an inert gas through the suction hole, and discharges the inert gas to the outside.

CITATION LIST

Patent Literature

Patent Literature 1: Japanese Unexamined Patent Publication No. 2010-280170

SUMMARY OF INVENTION

Technical Problem

The active energy irradiation device as described above is likely to increase in the size of the device due to the configuration for recovering the inert gas, which is a concern.

An object of the present disclosure is to provide an active energy irradiation device capable of recovering an inert gas while suppressing an increase in the size of the device.

Solution to Problem

According to one aspect of the present disclosure, there is provided an active energy irradiation device including: a plurality of active energy irradiation units arranged at least along a predetermined direction; a housing that houses the active energy irradiation units; an exhaust unit that is provided in the housing, and that discharges air to an outside of the housing; and an inert gas suction unit that suctions an inert gas outside the housing, and that allows the inert gas to flow into the housing. An air flow path allowing the air to flow through, and an inert gas flow path allowing the inert gas, which is allowed to flow in by the inert gas suction unit, to flow through are provided inside the housing. The air flow path and the inert gas flow path merge with each other. The exhaust unit exhausts the inert gas together with the air.

In this active energy irradiation device, the inert gas outside the housing can be recovered (namely, suctioned and exhausted from the exhaust unit to the outside) using the flow of air inside the housing. The need for a separate configuration for recovering the inert gas can be suppressed. Therefore, the inert gas can be recovered while suppressing an increase in the size of the device.

In the active energy irradiation device according to one aspect of the present disclosure may further include an air-cooled heatsink housed inside the housing and thermally connected to the active energy irradiation units, and the air flow path and the inert gas flow path may pass through the heatsink. In this case, the heatsink can radiate heat using not only the air but also the inert gas.

In the active energy irradiation device according to one aspect of the present disclosure may further include a duct provided between the heatsink and the exhaust unit inside the housing, and allowing the air, which has passed through the heatsink, to flow through to the exhaust unit, and end portion on a heatsink side of the duct may be inserted into grooves formed in heat radiation fins of the heatsink. In this case, the duct enables the air to efficiently flow through from the heatsink to the exhaust unit. In addition, since the end portion of the duct is inserted into the grooves of the heat radiation fins, the need for a seal member such as a packing at a connection between the duct and the heat radiation fins can be eliminated.

In the active energy irradiation device according to one aspect of the present disclosure, the inert gas suction unit may be a structure attached to the housing. In this case, for example, the inert gas suction unit can be attached to the housing as one unit.

In the active energy irradiation device according to one aspect of the present disclosure, the inert gas suction unit may include a suction port that suctions the inert gas, and a recovery flow path allowing the inert gas to flow through from the suction port into the housing. In this case, in the inert gas suction unit, the inert gas is suctioned from the suction port, and the recovery flow path enables the inert gas to flow through into the housing.

The active energy irradiation device according to one aspect of the present disclosure may further include an inert gas supply unit that supplies the inert gas to the outside of the housing, and the suction port may be provided at an end portion of the inert gas suction unit on a side away from the inert gas supply unit. In this case, the inert gas suction unit can suction the inert gas at a position spaced apart from the inert gas supply unit. Compared to a case where the inert gas is suctioned at a position close to the inert gas supply unit, for example, the flow speed of the inert gas can be lowered, and the inert gas can be efficiently suctioned.

In the active energy irradiation device according to one aspect of the present disclosure, the recovery flow path may allow the inert gas to flow through to a side toward the inert gas supply unit. In this case, the recovery flow path enables the inert gas to flow through and turn. The direct entry of ink mist and the like, which are contained in the inert gas, into the housing can be suppressed by the turning.

In the active energy irradiation device according to one aspect of the present disclosure, the recovery flow path may include a filter that captures at least ink mist contained in the inert gas. In this case, the entry of ink mist and the like, which are contained in the inert gas, into the housing can be suppressed by the filter.

In the active energy irradiation device according to one aspect of the present disclosure, the recovery flow path may include a shielding plate that shields at least ink mist contained in the inert gas. In this case, the entry of ink mist and the like, which are contained in the inert gas, into the housing can be suppressed by the shielding plate.

In the active energy irradiation device according to one aspect of the present disclosure, the recovery flow path may include an ink trap that accumulates ink formed by a liquefaction of ink mist contained in the inert gas. In this case, the ink formed by the liquefaction of ink mist can be accumulated in the recovery flow path.

In the active energy irradiation device according to one aspect of the present disclosure, the inert gas suction unit may be detachably attached to the housing. Accordingly, the replacement and maintenance of the inert gas suction unit can be easily performed.

In the active energy irradiation device according to one aspect of the present disclosure, the active energy irradiation units may perform irradiation with an ultraviolet ray or an electron beam. Accordingly, the active energy irradiation device can be used as a device that performs irradiation with an ultraviolet ray or an electron beam.

Advantageous Effects of Invention

According to the present disclosure, it is possible to provide the active energy irradiation device capable of recovering the inert gas while suppressing an increase in the size of the device.

BRIEF DESCRIPTION OF DRAWINGS

FIG. 11(*b*) is a front view of a second heat pipe of the heatsink illustrated in FIG. 4.

DESCRIPTION OF EMBODIMENTS

Figure 1:
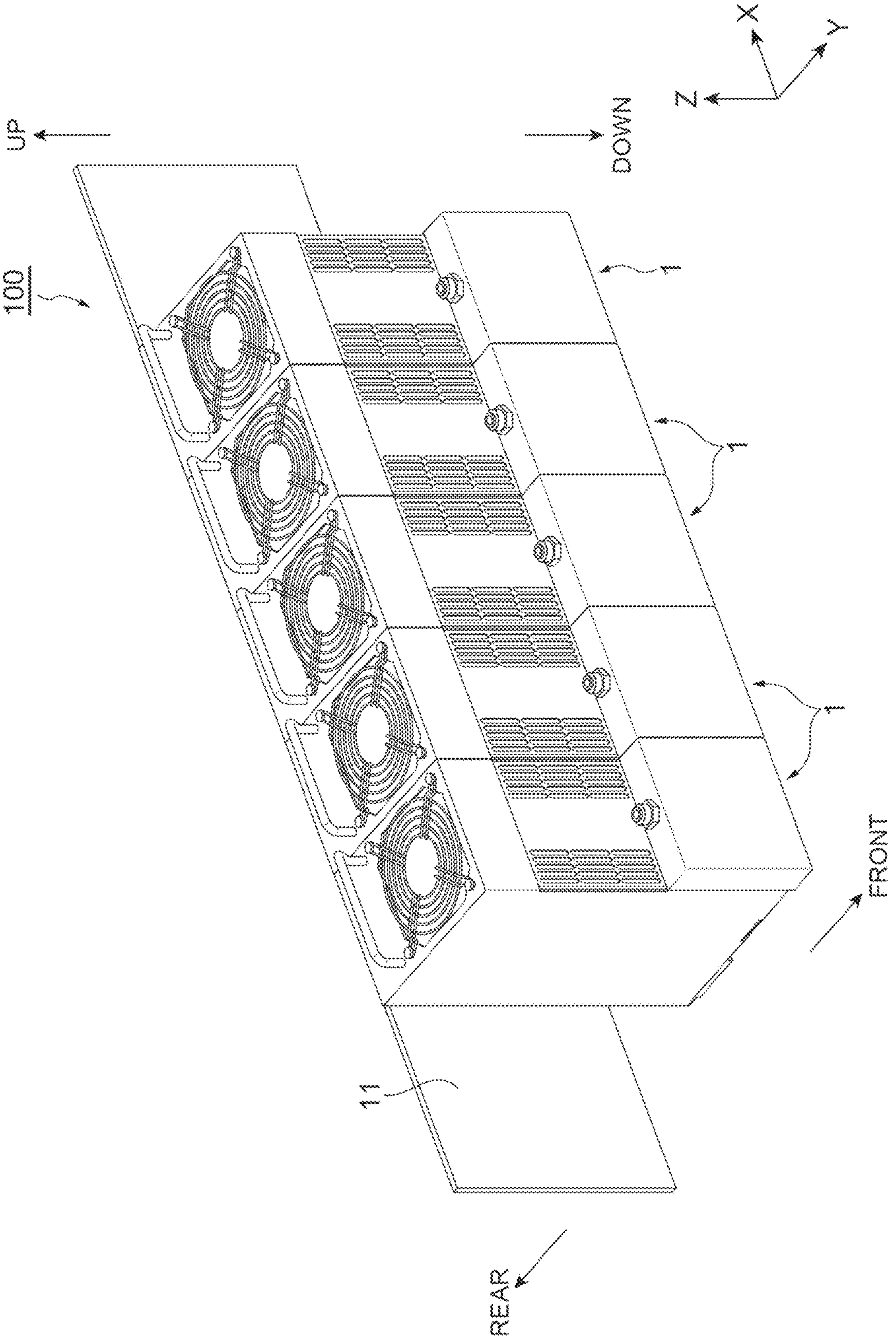
FIG. 1 is a perspective view of an active energy irradiation system according to one embodiment.
Figure 2:
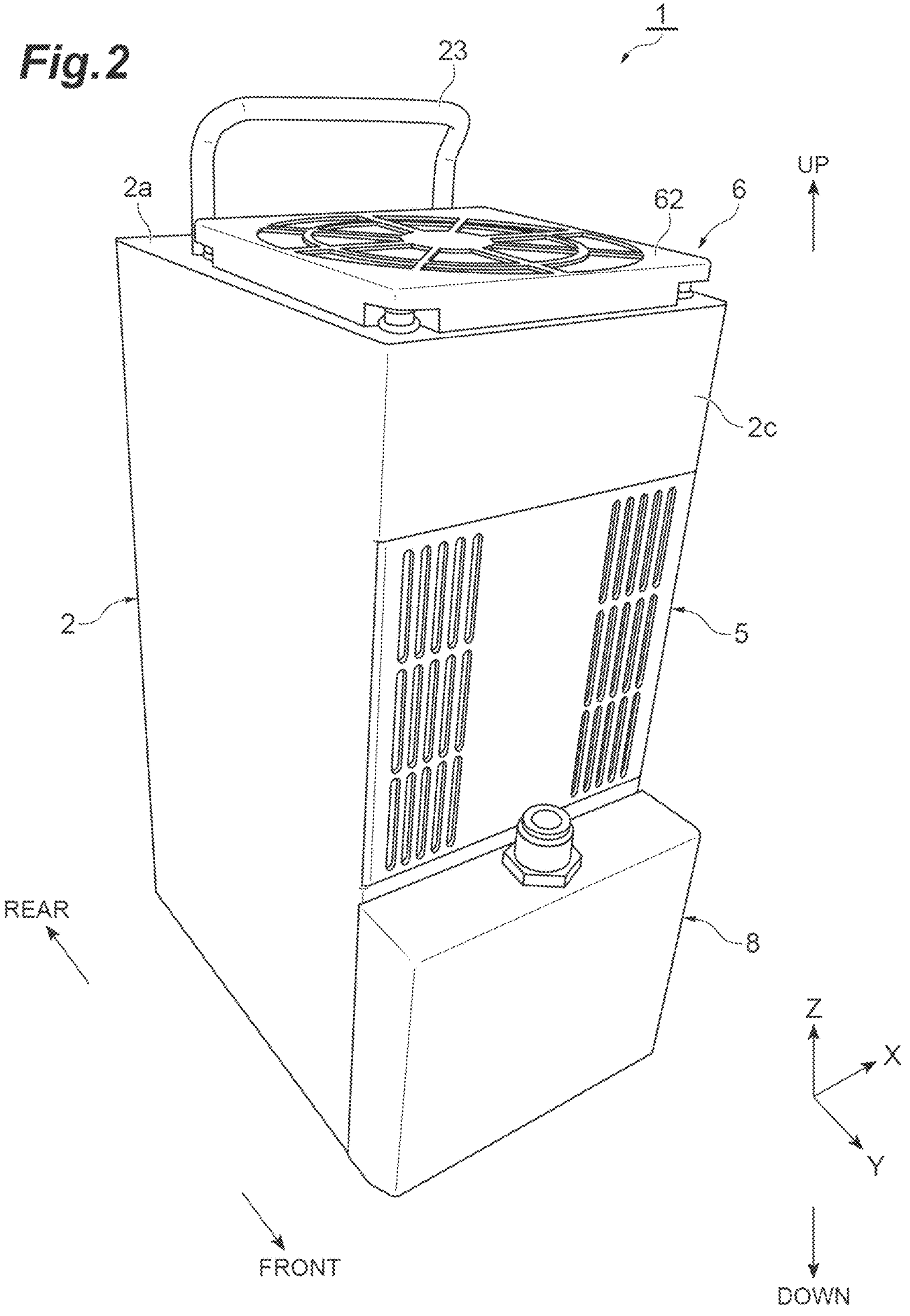
FIG. 2 is a perspective view of an active energy irradiation device illustrated in FIG. 1.

Hereinafter, an embodiment of the present disclosure will be described in detail with reference to the drawings. It should be noted that in the drawings, the same or equivalent portions are denoted by the same reference signs, and duplicate descriptions will be omitted.

As illustrated in FIG. 1, an active energy irradiation system 100 is, for example, a system that is installed in an ultraviolet (UV) printer, and includes a plurality of active energy irradiation devices 1. The active energy irradiation devices 1 are, for example, high-output air-cooled LED light sources for printing applications. The active energy irradiation devices 1 irradiate an irradiation target with light (ultraviolet rays, active energy rays) to dry ink on the irradiation target. Examples of the irradiation target include a printed matter to which a photocurable ink is adhered.

The active energy irradiation devices 1 have a rectangular parallelepiped outer shape. The active energy irradiation devices 1 are arranged to be in contact with each other in a predetermined direction. The plurality of active energy irradiation devices 1 arranged in the predetermined direction are fixed and held by a fixing plate 11. As illustrated in FIGS. 2, 3, 4, and 5, the active energy irradiation device 1 includes a housing 2, a plurality of LED substrates 3, a heatsink 4, an intake unit 5, an exhaust unit 6, a duct 7, an inert gas supply unit 8, and an inert gas suction unit 9.

Incidentally, for convenience of description, the predetermined direction in which the plurality of active energy irradiation devices 1 are arranged is defined as an "X direction", a direction perpendicular to the X direction, which is a light emission direction of the active energy irradiation devices 1, is defined as a "Z direction", and a direction orthogonal to the X direction and the Z direction is defined as a "Y direction". A side of the active energy irradiation device 1 from which light is emitted is defined as a "lower side", and the opposite side is defined as an "upper side". One side in the Y direction is defined as a "front side", and the other side in the Y direction is defined as a "rear side".

The housing 2 has a rectangular shape that is elongated in the Z direction. The housing 2 is made of metal. The housing 2 houses the LED substrates 3, the heatsink 4, and the duct 7. The housing 2 is configured by assembling a front casing 21 and a rear casing 22 to each other. A grip portion 23 for grasping the housing 2 is provided on an upper wall 2*a* of the housing 2. A driver substrate 12 with the Y direction as a thickness direction is disposed on the rear side inside the housing 2. The driver substrate 12 is an electrical driving circuit substrate for driving the active energy irradiation device 1. A driver substrate heatsink 13 that cools transistors and the like of the driver substrate 12 is disposed on the driver substrate 12. The driver substrate heatsink 13 is thermally connected to the transistors and the like of the driver substrate 12.

The LED substrate 3 includes a substrate 31 having a rectangular plate shape and constituting a predetermined circuit (refer to FIG. 8), and LED elements (active energy irradiation units) 32 that are light-emitting elements arranged at predetermined pitches in the X direction and the Y direction on the substrate 31. The LED elements 32 emit light (ultraviolet rays) downward. The LED substrates 3 are disposed at a lower end portion inside the housing 2 with the Z direction as a thickness direction of the substrates 31. The LED substrates 3 are arranged along the X direction. Accordingly, several to several hundred LED elements 32 are arranged at least in the X direction inside the housing 2. The irradiation target moving in the Y direction is irradiated with light emitted from each of the LED elements 32 on the LED substrates 3 through a light irradiation window 24 made of a glass plate and provided on a lower wall 2*b* of the housing 2.

The heatsink 4 is a heat radiation member thermally connected to the LED elements 32 on the LED substrates 3. The heatsink 4 is an air-cooled heatsink that radiates heat through heat exchange with air. Air constitutes a heat transfer medium (coolant) for cooling the LED elements 32.

The heatsink 4 includes a base plate 41, heat radiation fins 42, a heat pipe 43, and a partition plate (partition member) 44.

The base plate 41 has a rectangular plate shape. The plurality of LED substrates 3 are provided on a lower surface of the base plate 41. The lower surface of the base plate 41 is in contact with the substrates 31 of the LED substrates 3. The heat radiation fins 42 have a flat plate shape with the Y direction as a thickness direction. The heat radiation fins 42 are erected on an upper surface (surface) of the base plate 41. The heat radiation fins 42 are arranged to be stacked with gaps therebetween in the Y direction (first direction).

The heat pipe 43 is provided to be embedded in a plurality of the heat radiation fins 42. The heat pipe 43 is thermally connected to the plurality of heat radiation fins 42. The partition plate 44 is provided to intersect the plurality of heat radiation fins 42. The partition plate 44 has a flat plate shape with the X direction as a thickness direction. The partition plate 44 partitions the plurality of heat radiation fins 42 in the X direction (second direction). A pair of the partition plates 44 are provided spaced from each other in the X direction on the plurality of heat radiation fins 42. The pair of partition plates 44 partition the plurality of heat radiation fins 42 into a pair of outer portions 42*x* located outside in the X direction and an inner portion 42*y* located between the pair of outer portions.

Ends on a base plate 41 side of the partition plates 44 are spaced apart from the base plate 41. Namely, the partition plates 44 partition the plurality of heat radiation fins 42 such that more air passes through in the X direction between the plurality of heat radiation fins 42 on the lower side (base plate 41 side) than on the upper side (side opposite to the base plate 41 side). The partition plates 44 are brazed and fixed to the plurality of heat radiation fins 42. The heatsink 4 is attached to the housing 2 through a bracket 25 and a support frame 26 (refer to FIG. 7).

The intake unit 5 introduces air from outside the housing 2 into the housing 2. The intake unit 5 introduces the air into a buffer space BF to be described later inside the housing 2. The intake unit 5 is provided on a portion toward an upper side of the center of a wall portion 2*c* on the front side of the housing 2. The intake unit 5 includes an intake filter (filter unit) 51, a filter holding portion 52, and intake ports 53.

As illustrated in FIGS. 4, 5, 6, and 7, the intake filter 51 captures foreign matter (dust and the like) contained in the air introduced into the housing 2. The intake filter 51 is made of, for example, urethane or the like. The intake filter 51 has a rectangular plate-shaped outer shape. The intake filter 51 extends over the portion toward the upper side of the center of the wall portion 2*c* when viewed from the front. The filter holding portion 52 houses and holds the intake filter 51. The filter holding portion 52 includes an outer plate 52*x* having a rectangular plate shape with the Y direction as a thickness direction. A front surface of the outer plate 52*x* is located on the same plane as a front surface of the wall portion 2*c* of the housing 2. The filter holding portion 52 is detachably attached to the duct 7 and the support frame 27 provided on the duct 7.

The intake ports 53 are through-holes that are open along the Y direction (direction intersecting a direction from the heatsink 4 toward the exhaust unit 6), and that communicate with the inside of the housing 2. The intake ports 53 are arranged in proximity to each other in regions at both end portions in the X direction of the outer plate 52*x*. The intake ports 53 are through-holes having an elongated hole shape with the Z direction as a longitudinal direction. Air suctioned from the intake ports 53 is introduced into the buffer space BF inside the housing 2 through the intake filter 51 (refer to FIG. 8).

The exhaust unit 6 discharges the air from inside the housing 2 to the outside of the housing 2. The exhaust unit 6 is provided on an upper end portion of the housing 2. The exhaust unit 6 includes a fan 61. For example, an axial fan is used as the fan 61. The fan 61 delivers the air, which is suctioned from the lower side along the Z direction, to the upper side under pressure along the Z direction. The fan 61 is fixed to an upper end portion inside the housing 2. An exhaust filter 62 made of, for example, urethane or the like is attached to the upper wall 2*a* of the housing 2 located on a discharge side of the fan 61. Incidentally, the exhaust filter 62 is illustrated only in the FIG. 2 for the sake of convenience, and the illustration in the other drawings is omitted. For example, an external pipe for outdoor exhaust (not illustrated) is connected to the discharge side of the fan 61 of the exhaust unit 6.

The duct 7 is provided between the heatsink 4 and the exhaust unit 6 inside the housing 2. The duct 7 allows the air, which has passed through the heatsink 4, to flow through to the exhaust unit 6. The duct 7 allows an inert gas, which has passed through the heatsink 4, to flow through to the exhaust unit 6. The duct 7 has a rectangular pipe shape. The duct 7 includes a linear portion 71 extending in the Z direction with a constant cross-sectional area, and an enlarged portion 72 provided on a downstream side of the linear portion 71 and extending in the Z direction such that the cross-sectional area increases as the enlarged portion 72 extends downstream.

The buffer space BF (refer to FIG. 8) that is a space into which air is introduced from outside by the intake unit 5 is provided on one side and the other side in the X direction of the duct 7 inside the housing 2. The buffer space BF is a space defined by inner surfaces of the housing 2 and outer surfaces of the linear portion 71 and the enlarged portion 72 of the duct 7. Lower end portions of the duct 7 are inserted and fixed to grooves 47 formed in the heat radiation fins 42 of the heatsink 4. An upper end portion of the duct 7 is fixed to a suction side of the fan 61. The duct 7 is attached to the housing 2 through the support frame 27.

As illustrated in FIGS. 2, 3, 4, and 5, the inert gas supply unit 8 supplies inert gas to the outside of the housing 2. Examples of the inert gas include nitrogen. The inert gas supply unit 8 forms a region, which is dominated by the inert gas (region with low oxygen concentration), in a region including an irradiation region of light from the plurality of LED elements 32, by supplying the inert gas. The inert gas supply unit 8 is attached to a lower end portion of the wall portion 2*c* on the front side of the housing 2. The inert gas supply unit 8 includes a purge housing 81 having a rectangular box shape; a socket 82 provided on an upper end surface of the purge housing 81; and a spray port 83 provided at a lower end portion of the purge housing 81. In the inert gas supply unit 8, the inert gas is introduced from the socket 82 into the purge housing 81, and the inert gas is sprayed from the spray port 83.

The inert gas suction unit 9 suctions the inert gas outside the housing 2, and causes the inert gas to flow into the housing 2. The inert gas suction unit 9 is a structure attached to the housing 2. The inert gas suction unit 9 is detachably attached to a rear side of the lower wall 2*b* of the housing 2 by fasteners such as screws. The inert gas suction unit 9 includes a suction unit housing 91 having a rectangular box shape; a suction port 92 provided in a lower surface of the suction unit housing 91; and a recovery flow path 93 provided inside the suction unit housing 91 (refer to FIG. 7). In the inert gas suction unit 9, the inert gas is suctioned into the suction unit housing 91 through the suction port 92, and the inert gas is allowed to flow through into the housing 2 by the recovery flow path 93.

Figure 6:
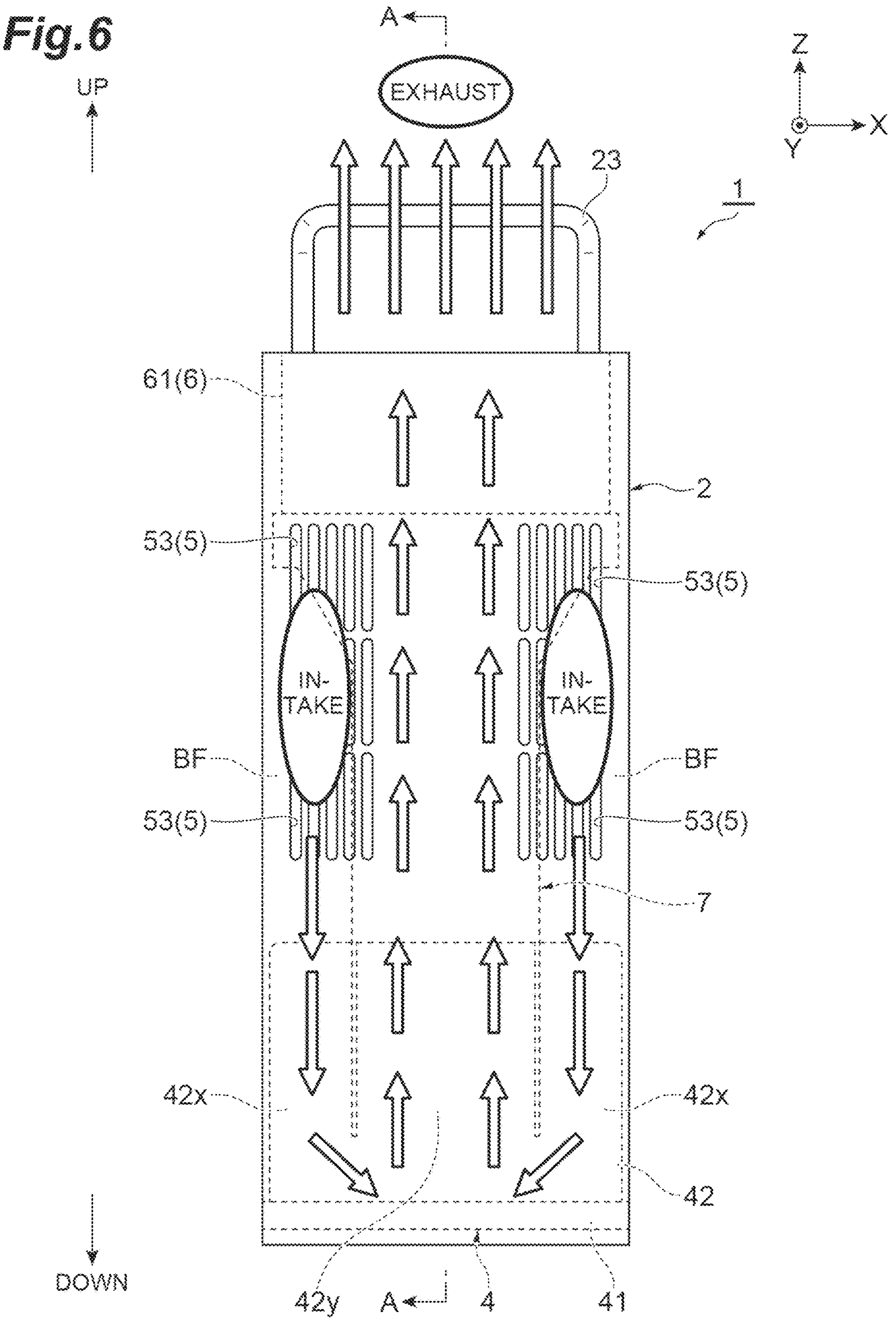
FIG. 6 is a front view illustrating the flows of air in the active energy irradiation device illustrated in FIG. 2.
Figure 7:
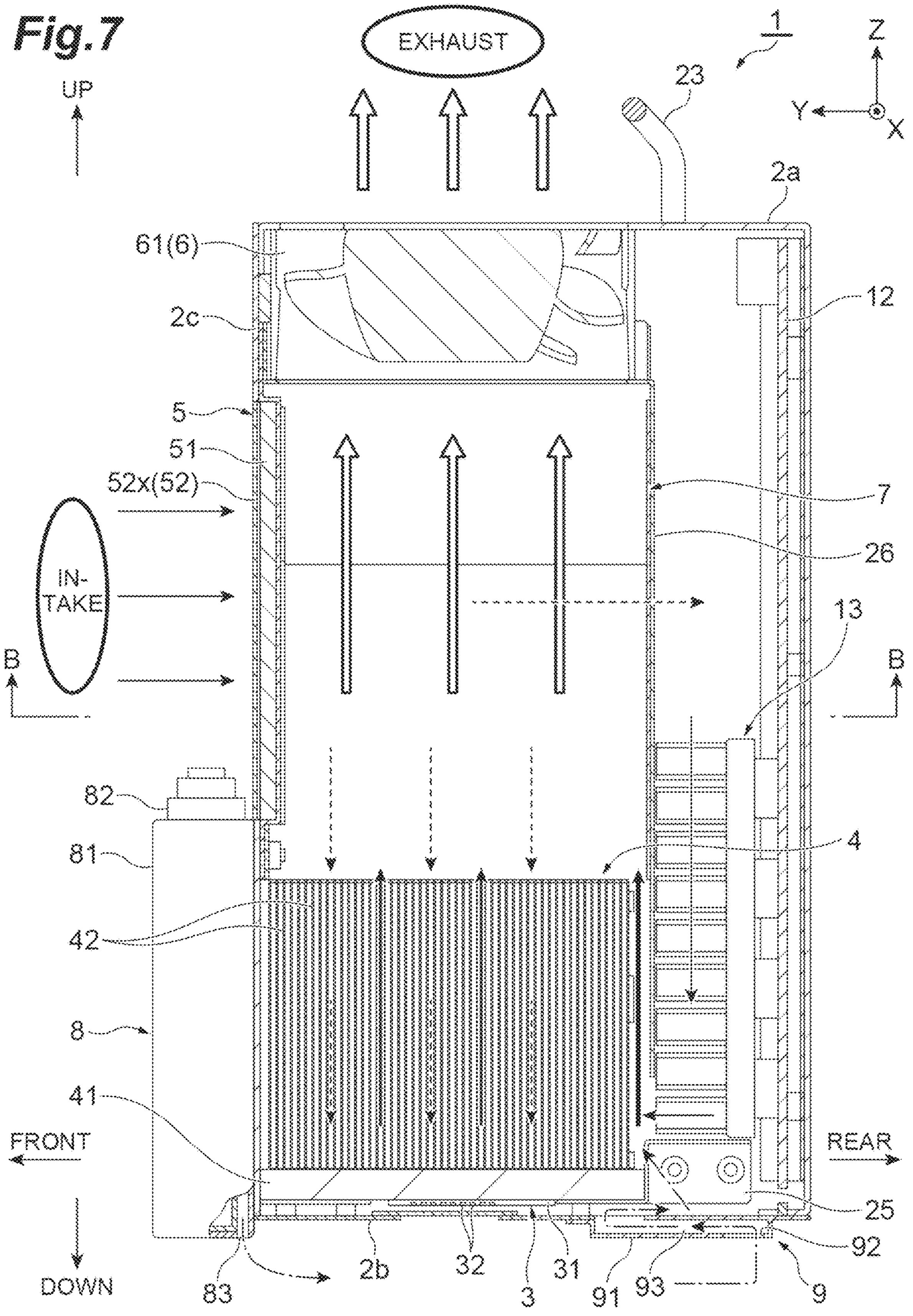
FIG. 7 is a cross-sectional view of the active energy irradiation device taken along line A-A illustrated in FIG. 6.
Figure 8:
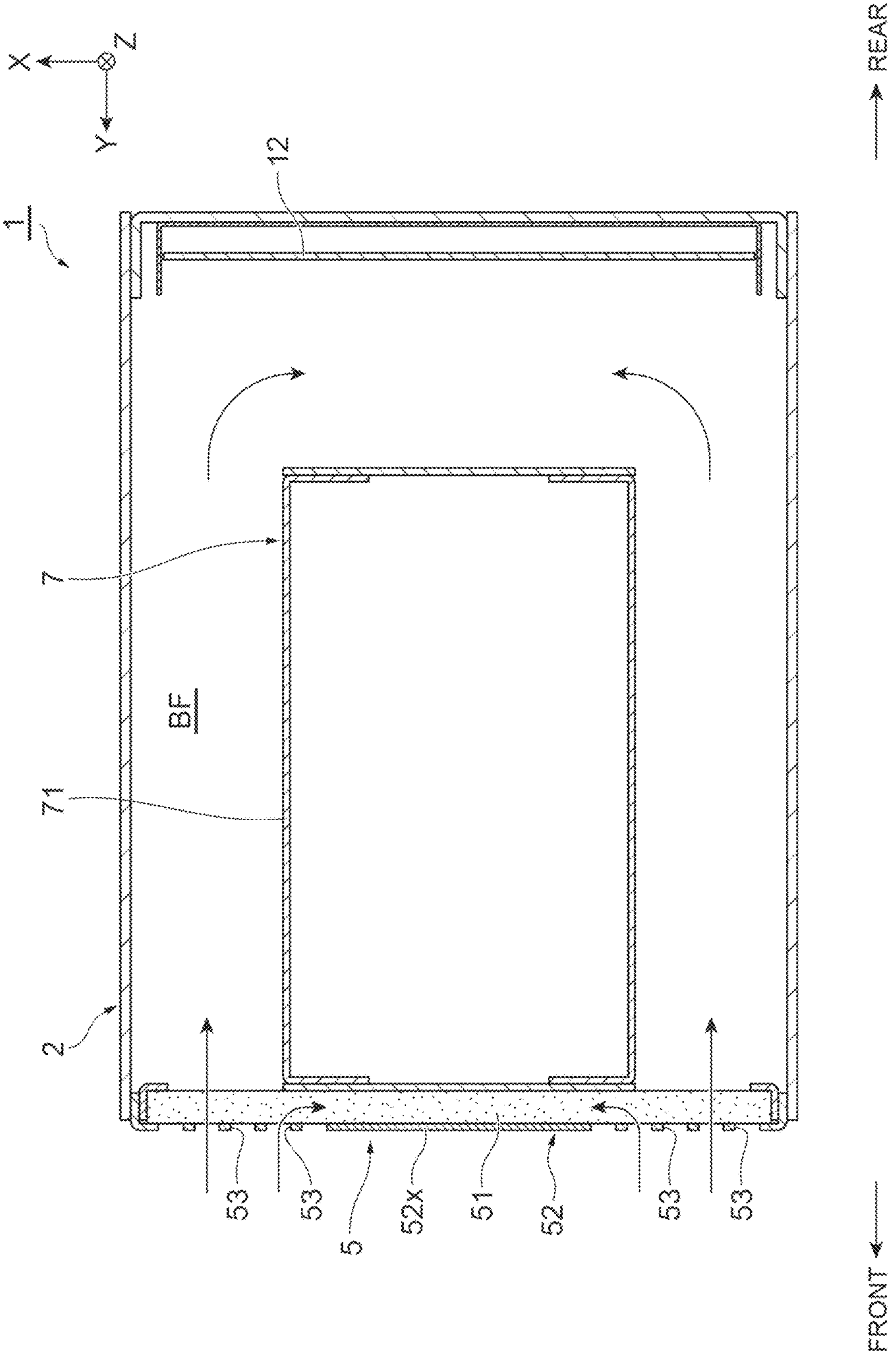
FIG. 8 is an end view of the active energy irradiation device taken along line B-B illustrated in FIG. 7.

As illustrated in FIGS. 6, 7, and 8, in the active energy irradiation device 1, outside air is introduced into the buffer space BF inside the housing 2 by the intake unit 5. The air introduced into the buffer space BF flows downward along the Z direction, and then passes through the heatsink 4 and flows into the duct 7. At this time, in the heatsink 4, the air flows downward along the Z direction between the plurality of heat radiation fins 42 of each of the pair of outer portions 42*x*, and then flows to pass through between the partition plates 44 and the base plate 41 and to turn upward, and merges at the inner portion 42*y*. Then, the air flows upward along the Z direction between the plurality of heat radiation fins 42 of the inner portion 42*y*, and flows into the duct 7.

In addition, the air introduced into the buffer space BF flows downward along the Z direction, and then passes through the driver substrate heatsink 13. The air that has passed through the driver substrate heatsink 13 merges with the flow in the inner portion 42*y* of the heatsink 4 through a lower rear space inside the housing 2, flows upward along the Z direction between the plurality of heat radiation fins 42 of the inner portion 42*y*, and flows into the duct 7. The air that has flowed into the duct 7 flows upward along the Z direction, and is discharged to the outside of the housing 2 through the fan 61.

As illustrated in FIG. 7, in the active energy irradiation device 1, the inert gas sprayed from the inert gas supply unit 8 is suctioned by the inert gas suction unit 9, and flows into the housing 2. The inert gas that has flowed into the housing 2 merges with the flow in the inner portion 42*y* of the heatsink 4 through the lower rear space inside the housing 2, flows upward along the Z direction between the plurality of heat radiation fins 42 of the inner portion 42*y*, together with the air, and flows into the duct 7. The inert gas that has flowed into the duct 7 flows upward along the Z direction, together with the air, and is discharged to the outside of the housing 2 through the fan 61, together with the air.

Figure 9:
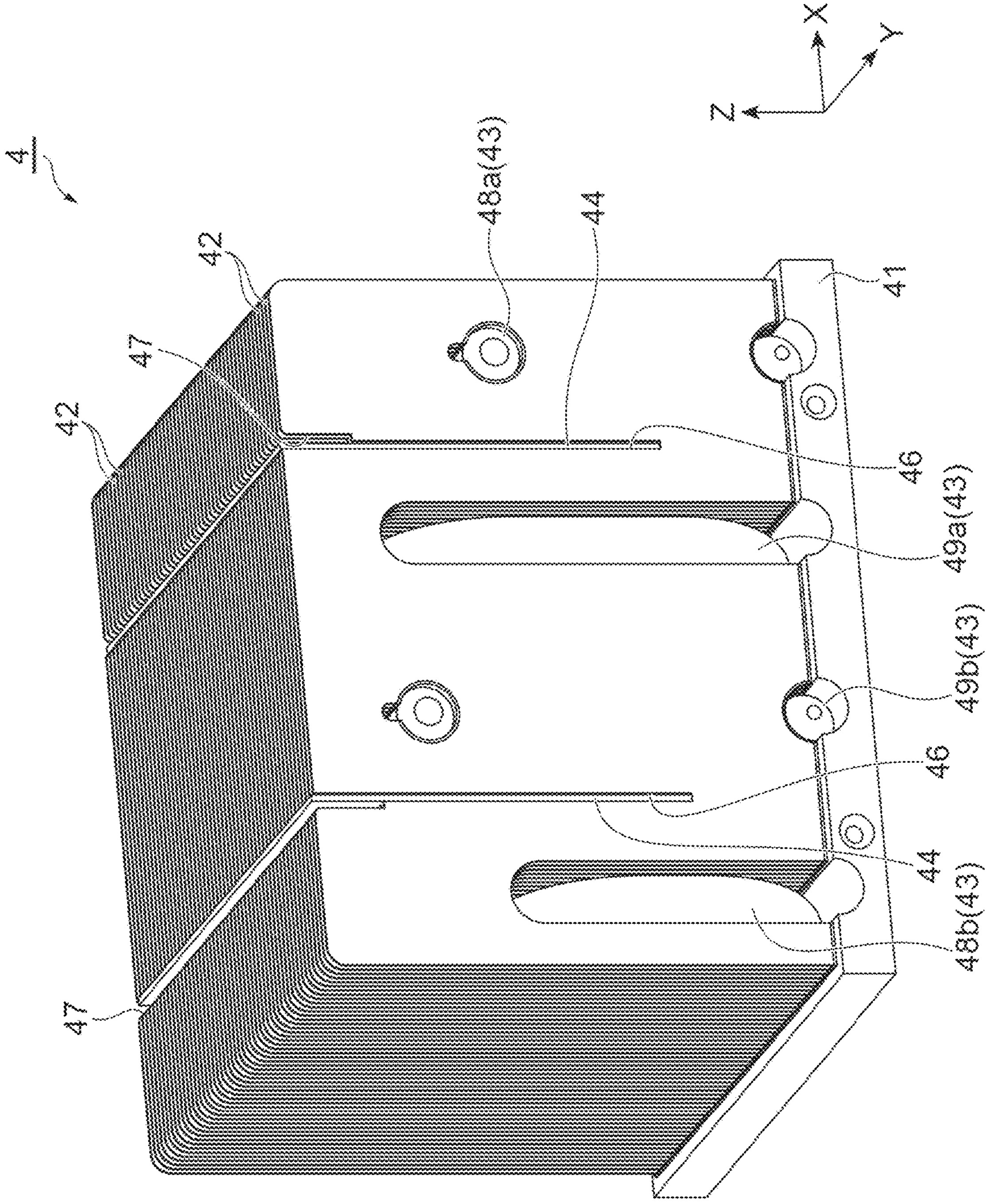
FIG. 9 is a perspective view of a heatsink illustrated in FIG. 4.
Figure 10:
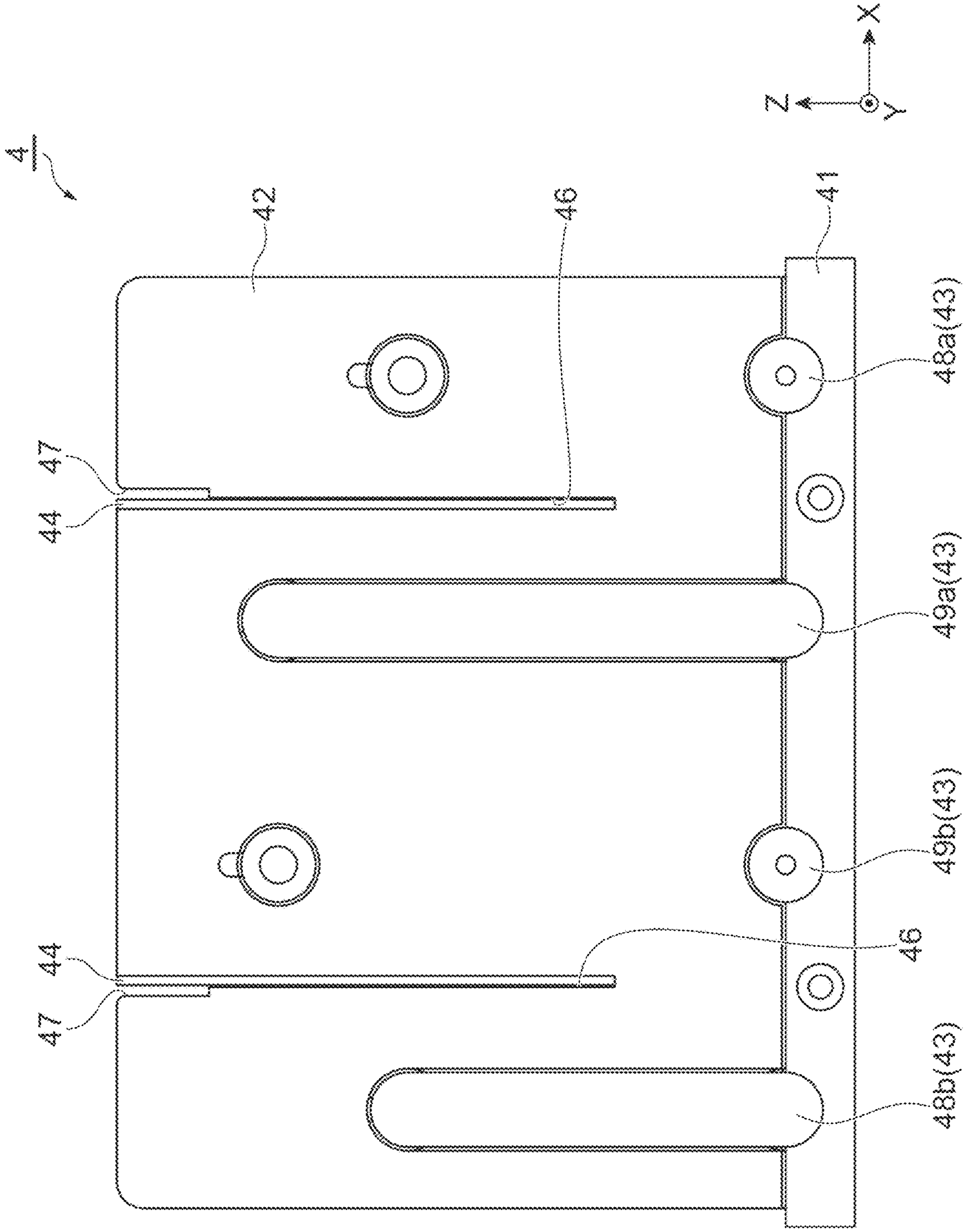
FIG. 10 is a front view of the heatsink illustrated in FIG. 4.
Figure 11:
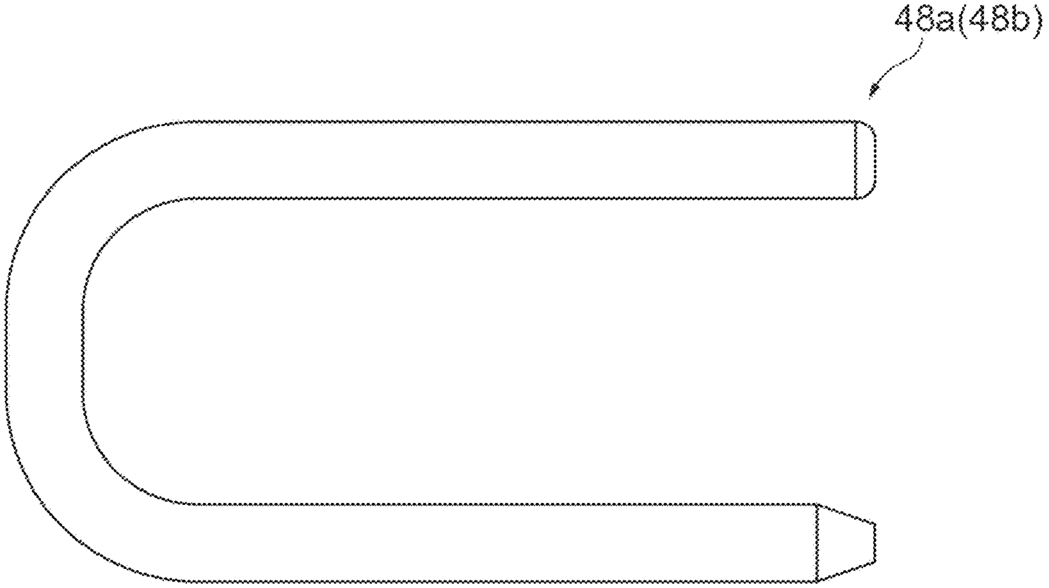
FIG. 11(*a*) is a front view of a first heat pipe of the heatsink illustrated in FIG. 4.
Figure 11:
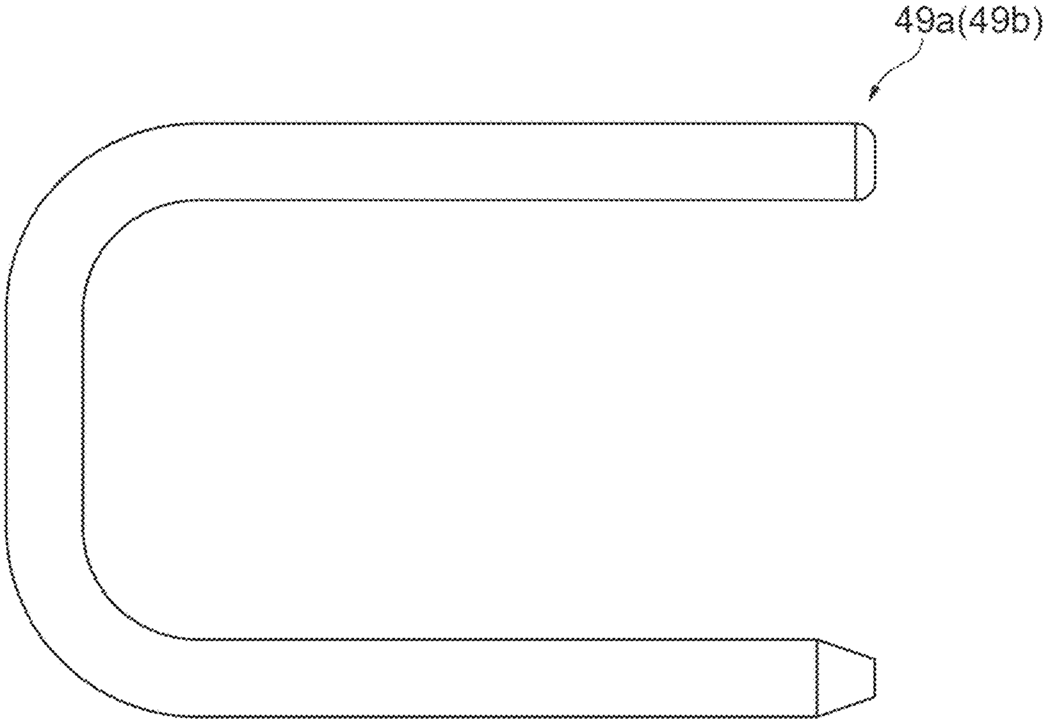

In the active energy irradiation device 1 of the present embodiment, as illustrated in FIGS. 9, 10, 11(*a*), and 11(*b*), the heat pipe 43 of the heatsink 4 is bent in a U shape and extends when viewed in the X direction. The heat pipe 43 linearly extends in the Z direction when viewed in the Y direction. The heat pipe 43 includes a pair of first heat pipes 48*a* and 48*b* provided spaced apart from each other in the X direction, and a pair of second heat pipes 49*a* and 49*b* provided spaced apart from each other in the X direction between the pair of first heat pipes 48*a* and 48*b*. The second heat pipes 49*a* and 49*b* are longer than the first heat pipes 48*a* and 48*b*.

Figure 5:
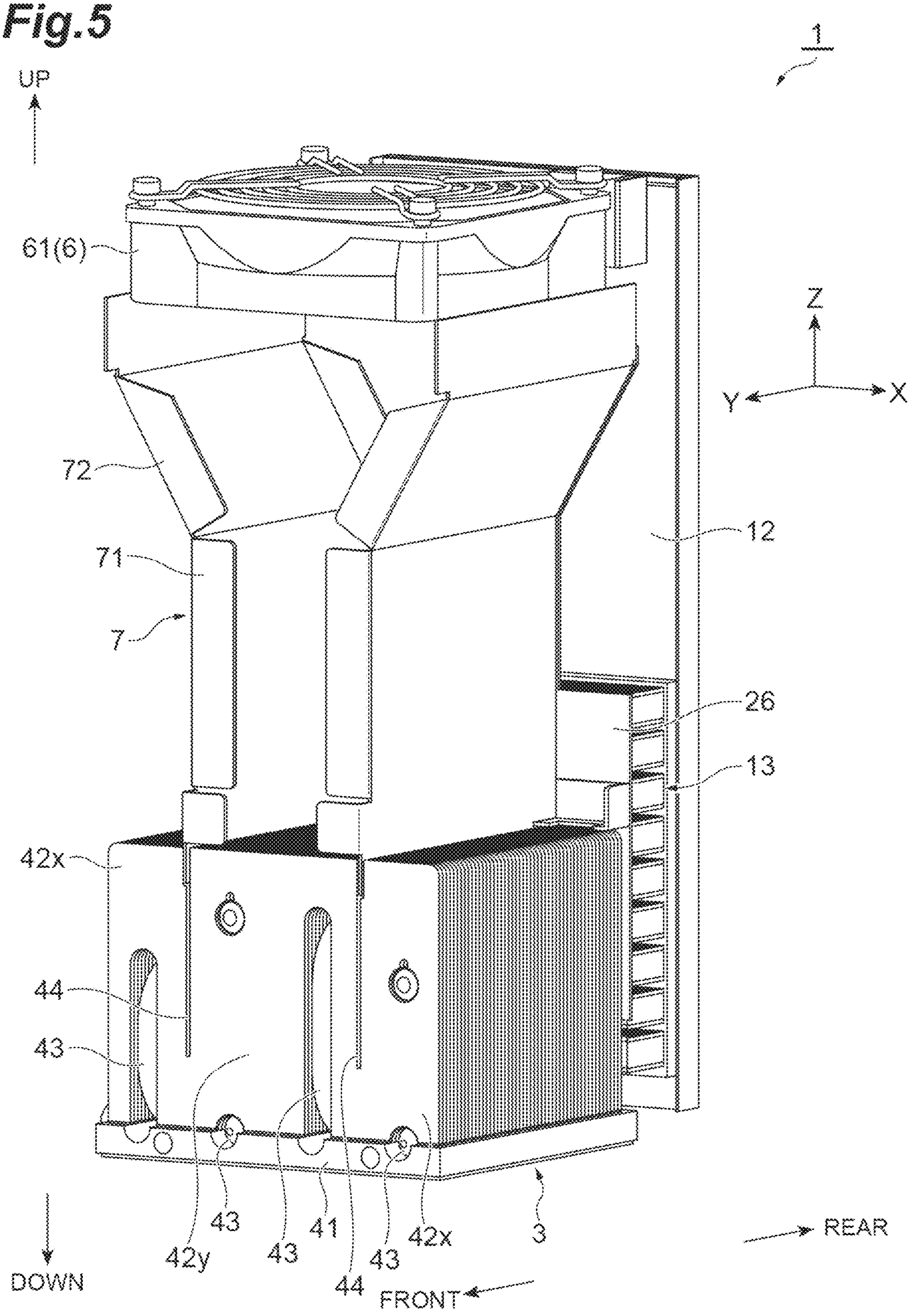
FIG. 5 is a perspective view illustrating an internal configuration of a housing in the active energy irradiation device illustrated in FIG. 2.

As illustrated in FIGS. 5, 9, and 10, the heat pipes 43 adjacent to each other differ by 180° in the direction of the U shape (direction of an opening side of the U shape). Specifically, the first heat pipe 48*a* and the second heat pipe 49*b* that are not adjacent to each other linearly extend rearward along the Y direction so as to be in contact with the base plate 41, and then extend to be bent upward and forward, and linearly extend forward along the Y direction. The first heat pipe 48*b* and the second heat pipe 49*a* that are not adjacent to each other linearly extend forward along the Y direction so as to be in contact with the base plate 41, and then extend to be bent upward and rearward, and linearly extend rearward along the Y direction. A linearly extending portion of the heat pipe 43 is brazed and fixed to the plurality of heat radiation fins 42.

The partition plates 44 are provided such that upper end surfaces of the partition plates 44 are located on the same plane as upper end surfaces of the heat radiation fins 42. The partition plates 44 extend such that lower ends of the partition plates 44 are located between the center of the heat radiation fins 42 and the base plate 41 in the Z direction. Namely, as described above, the lower ends of the partition plates 44 are spaced apart from the base plate 41. The partition plates 44 extend to intersect all the heat radiation fins 42 in the Y direction.

The partition plates 44 are interposed in slits 46 formed in the plurality of heat radiation fins 42. The slits 46 are open on the side opposite to the base plate 41 side, and are open in the Y direction. A thickness of the partition plates 44 is less than or equal to a width in the X direction of the slits 46. The slits 46 are each provided between the first heat pipe 48*a* and the second heat pipe 49*a* adjacent to each other and between the first heat pipe 48*b* and the second heat pipe 49*b* adjacent to each other in the X direction. Namely, the partition plates 44 are each provided between the first heat pipe 48*a* and the second heat pipe 49*a* adjacent to each other and between the first heat pipe 48*b* and the second heat pipe 49*b* adjacent to each other.

Figure 12:
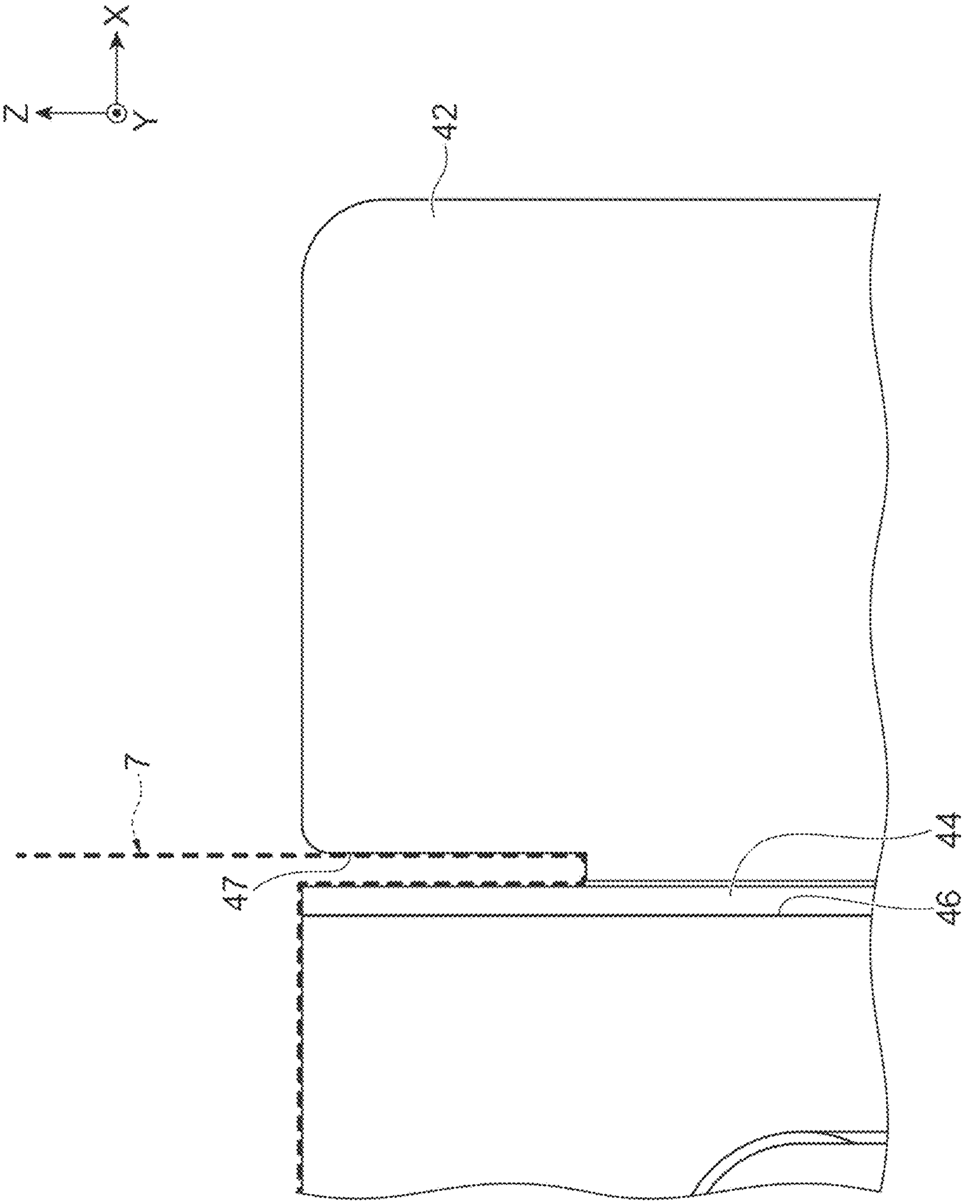
FIG. 12 is a partial enlarged front view of the heatsink illustrated in FIG. 4.

As illustrated in FIGS. 5 and 12, the lower end portions of the duct 7 (end portions on a heatsink 4 side) are inserted into the grooves 47 formed in the heat radiation fins 42 of the heatsink 4. Specifically, at the lower end portions of the duct 7, a pair of side walls facing each other in the X direction (plate-shaped portions with the X direction as a thickness direction) protrude downward. The grooves 47 are open upward and are open in the Y direction. The grooves 47 are provided to continue with the slits 46 at upper end portions of the plurality of heat radiation fins 42.

A thickness of the lower end portion of the duct 7 is less than or equal to a width in the X direction of the groove 47. The lower end portions of the duct 7 are press-fitted into the grooves 47 through a heat conductive grease (heat conductive material). Accordingly, the lower end portions of the duct 7 are fixed to the plurality of heat radiation fins 42 while being thermally connected thereto, and are in overlapping contact with outer sides in the X direction of the partition plates 44. As a result, the inner portion 42*y* of the plurality of heat radiation fins 42 partitioned off by the partition plates 44 communicates with the inside of the duct 7 in an airtight manner. The heat conductive grease is not particularly limited, and various greases can be used.

As described above, the buffer space BF illustrated in FIG. 8 is formed inside the housing 2. The buffer space BF forms a flow path allowing the air to flow from the upper side into the gaps between the plurality of heat radiation fins 42 in the pair of outer portions 42*x* of the heatsink 4.

In the active energy irradiation device 1 of the present embodiment, as described above, an air flow path allowing the air to flow through from the intake unit 5 to the exhaust unit 6, and an inert gas flow path allowing the inert gas to flow through from the inert gas suction unit 9 to the exhaust unit 6 are provided inside the housing 2. The air flow path includes a flow path passing through the buffer space BF, the heatsink 4, and the duct 7 in order from the intake unit 5, and reaching the exhaust unit 6. The air flow path includes a flow path passing through the buffer space BF, the driver substrate heatsink 13, the lower rear space inside the housing 2, the heatsink 4, and the duct 7 in order from the intake unit 5, and reaching the exhaust unit 6. The inert gas flow path includes a flow path passing through the lower rear space inside the housing 2, the heatsink 4, and the duct 7 in order from the inert gas suction unit 9, and reaching the exhaust unit 6. Namely, the air flow path and the inert gas flow path merge with each other. The exhaust unit 6 exhausts the inert gas with the air.

Figure 3:
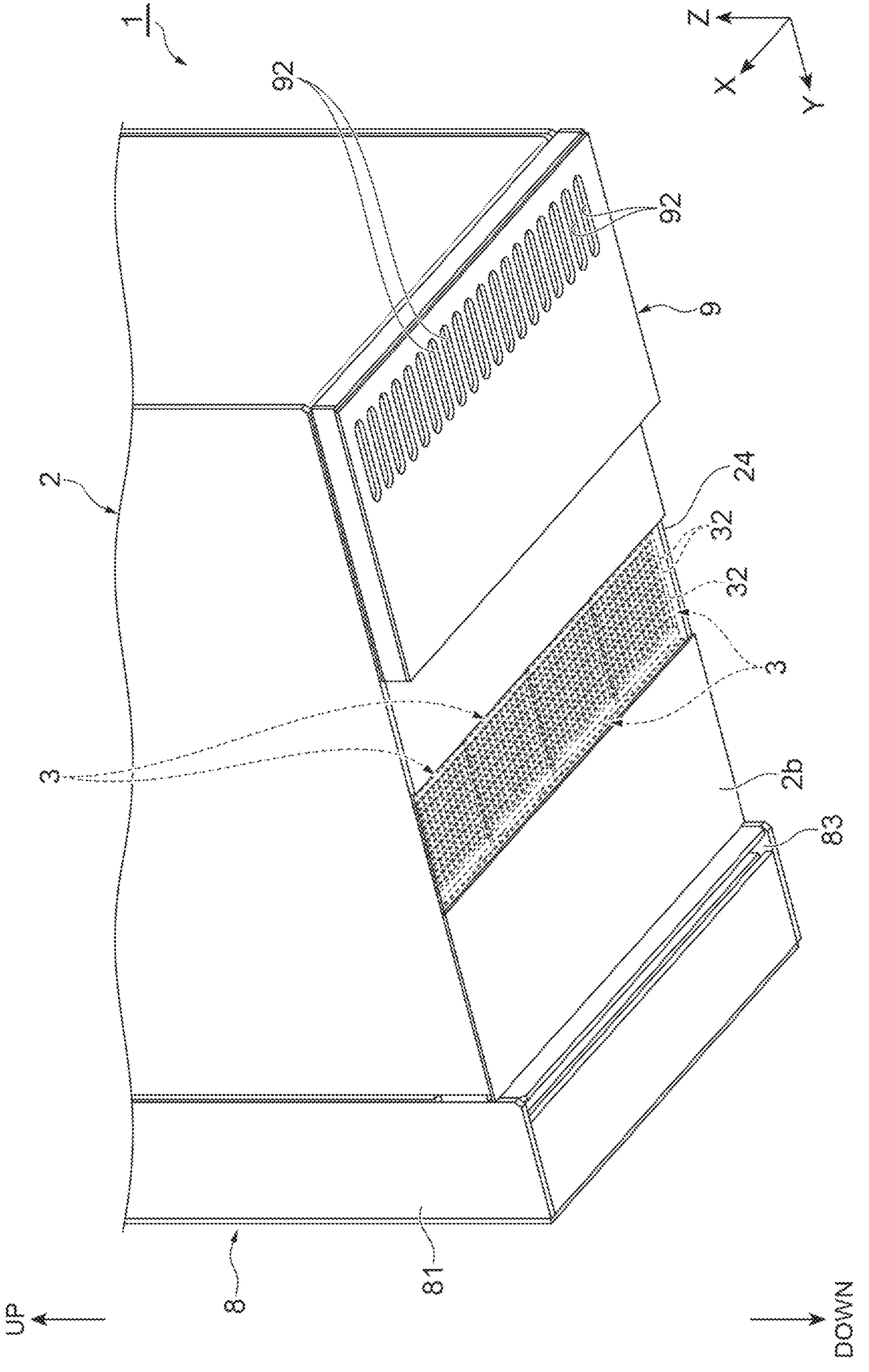
FIG. 3 is a perspective view of the active energy irradiation device illustrated in FIG. 2 when viewed from below.
Figure 4:
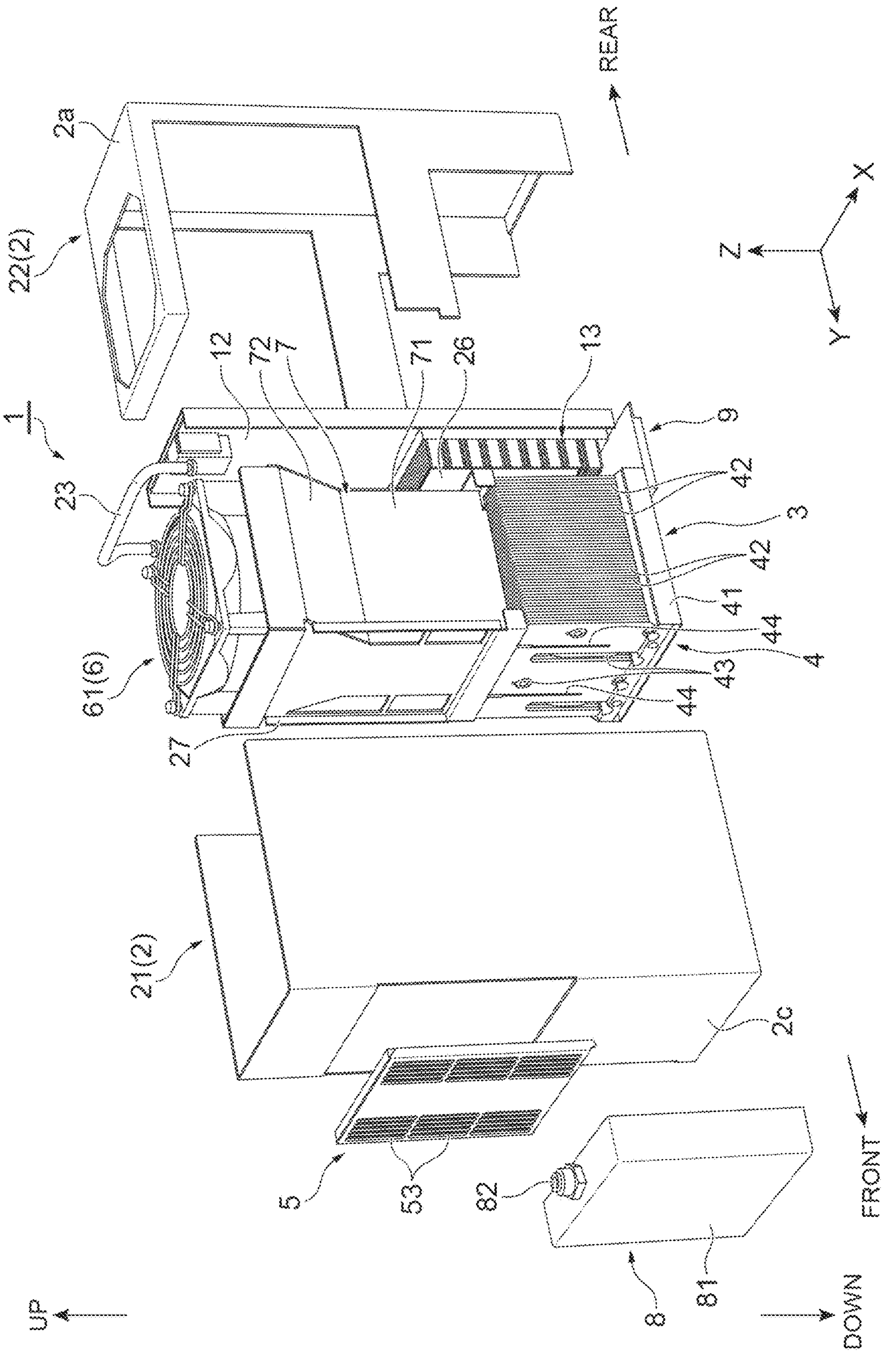
FIG. 4 is an exploded perspective view of the active energy irradiation device illustrated in FIG. 2.
Figure 13:
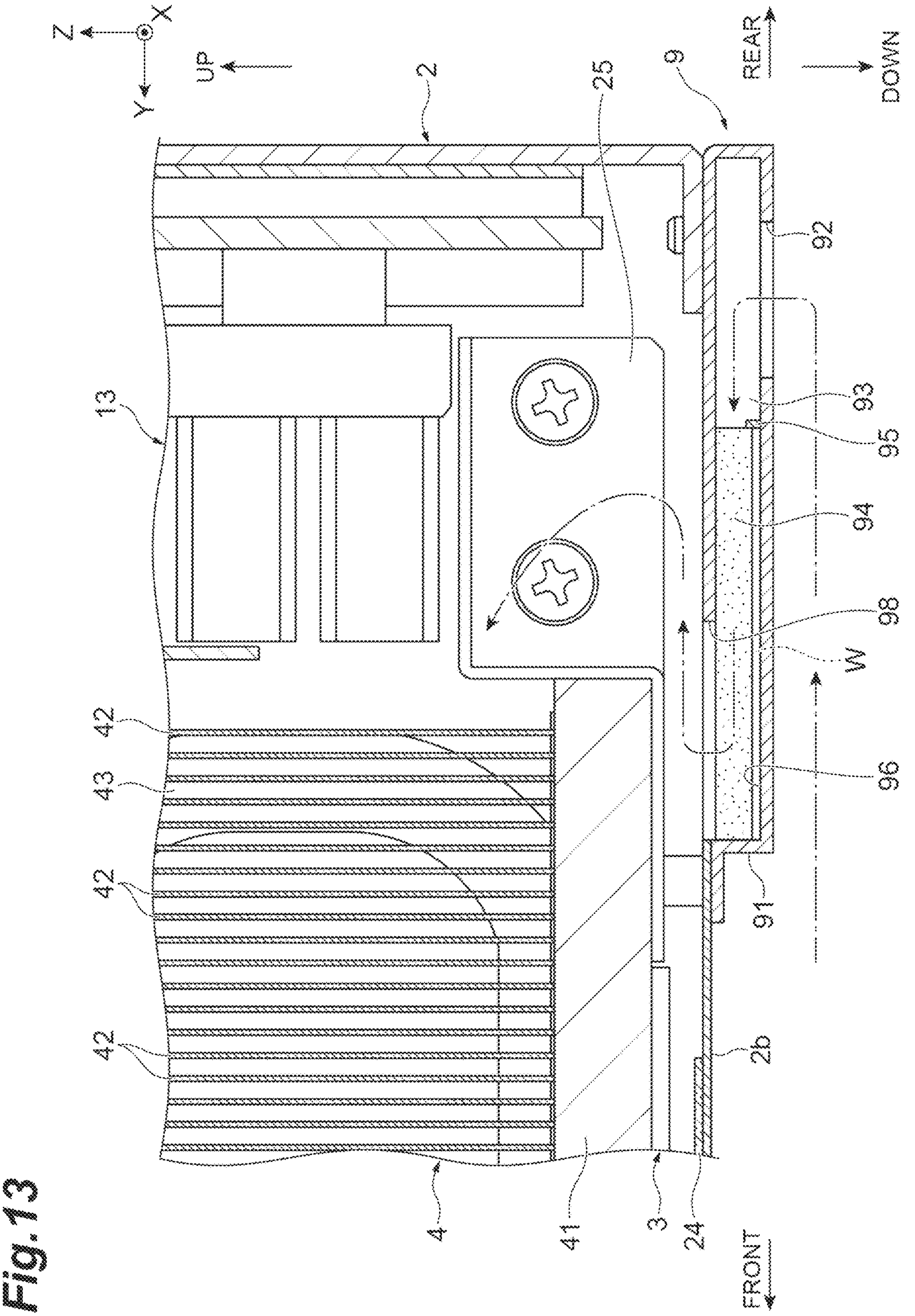
FIG. 13 is a cross-sectional view of an inert gas suction unit illustrated in FIG. 7.

As illustrated in FIGS. 3, 7, and 13, the inert gas suction unit 9 is disposed on a downstream side of the LED substrates 3 in a movement direction of the irradiation target. As described above, the inert gas suction unit 9 includes the suction port 92 that suctions the inert gas, and the recovery flow path 93 allowing the inert gas to flow through from the suction port 92 into the housing 2. The suction port 92 is provided at an end portion of the suction unit housing 91 of the inert gas suction unit 9 on a side away from the inert gas supply unit 8 (rear side). A plurality of the suction ports 92 are provided. The suction ports 92 are through-holes having an elongated hole shape that is elongated in the Y direction. The suction ports 92 are arranged in the X direction. The recovery flow path 93 allows the inert gas to flow through to a side toward the inert gas supply unit 8 (front side). The recovery flow path 93 introduces the inert gas, which has flowed through to the front side, into the housing 2 through an introduction port 98. The recovery flow path 93 is formed by an internal space of the suction unit housing 91. The recovery flow path 93 includes a filter 94, a shielding plate 95, and an ink trap 96.

The filter 94 captures at least ink mist contained in the inert gas. The filter 94 is disposed in the course of the recovery flow path 93 (inside the suction unit housing 91). The filter 94 is not particularly limited, and a known filter can be used. The shielding plate 95 shields at least ink mist contained in the inert gas. The shielding plate 95 is a flat plate-shaped member with the Y direction as a thickness direction. The shielding plate 95 has a surface intersecting a flow-through direction of the recovery flow path 93. The shielding plate 95 is erected inside the suction unit housing 91. In the illustrated example, the shielding plate 95 is provided on an upstream side of the filter 94 in the recovery flow path 93.

The ink trap 96 accumulates ink W formed by the liquefaction of ink mist contained in the inert gas. The ink trap 96 is a portion having a function of blocking a certain amount of the ink W. In the ink trap 96, ink mist collects, liquefies, and accumulates. The ink trap 96 is provided on a downstream side of the shielding plate 95 in the recovery flow path 93. Namely, in the ink trap 96, the accumulated ink W is blocked by the shielding plate 95. In the illustrated example, the ink trap 96 is defined by inner surfaces of the shielding plate 95 and the suction unit housing 91. The ink trap 96 is provided below the filter 94 in the recovery flow path 93. The ink trap 96 can store the ink W formed by the liquefaction of ink mist accumulated in the filter 94.

In the inert gas suction unit 9, as illustrated in FIG. 13, the inert gas supplied from the inert gas supply unit 8 and flowing rearward is suctioned into the inert gas suction unit 9 through the suction ports 92. The inert gas suctioned from the suction ports 92 is allowed to flow and turn forward by the recovery flow path 93, and is introduced into the housing 2 through the introduction port 98. Then, the inert gas introduced into the housing 2 merges with the air flowing through inside the housing 2, and flows to the heatsink 4.

Incidentally, the air flow path is formed by the intake unit 5, the buffer space BF, the heatsink 4 (gaps between the heat radiation fins 42), the duct 7, the driver substrate heatsink 13, the lower rear space inside the housing 2, and the exhaust unit 6. The inert gas flow path is formed by the inert gas suction unit 9, the lower rear space inside the housing 2, the heatsink 4, the duct 7, and the exhaust unit 6.

Figure 14:
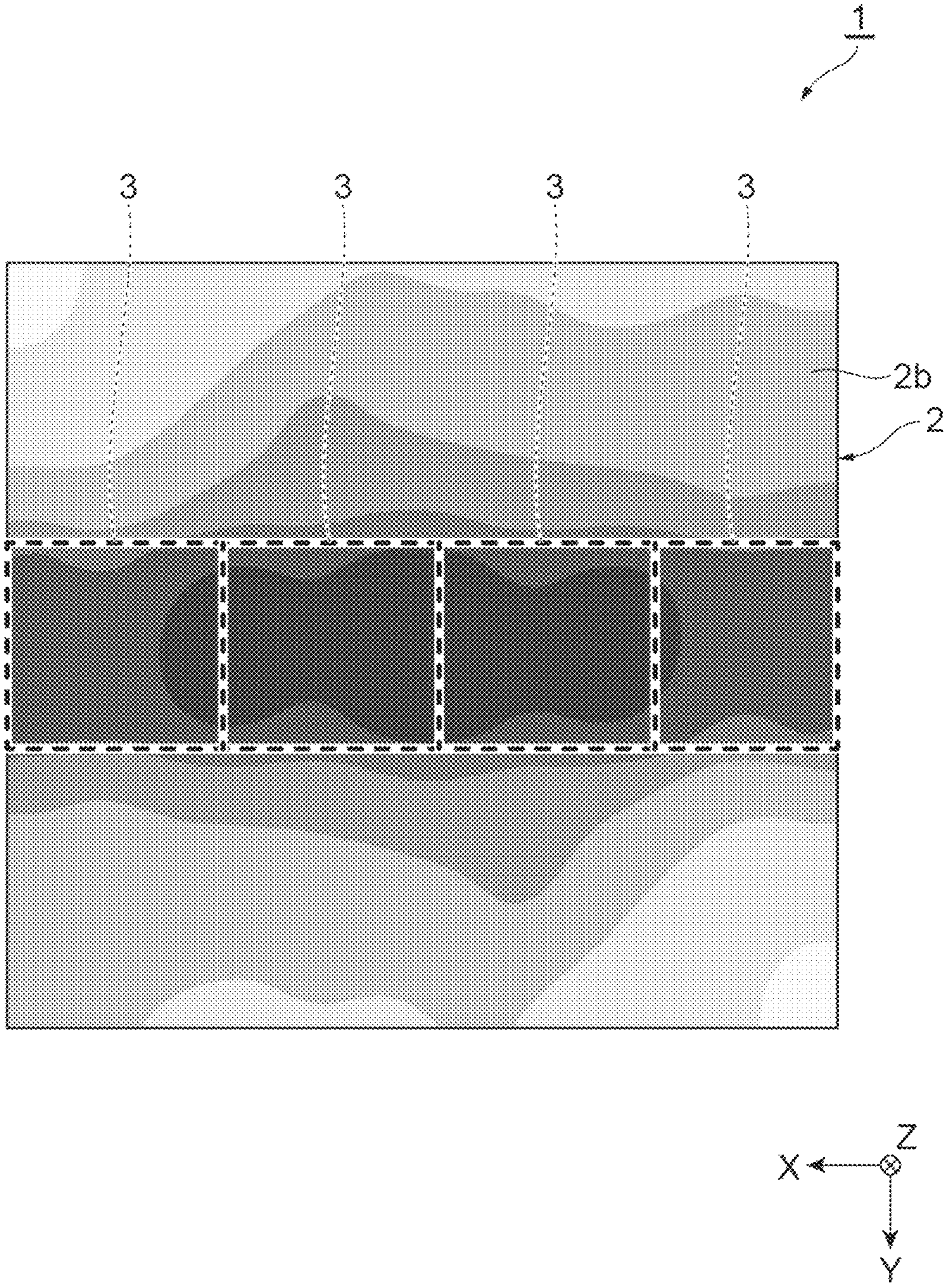
FIG. 14 is a view illustrating a thermal camera image of a periphery of LED substrates in the active energy irradiation device illustrated in FIG. 1.

FIG. 14 is a view illustrating a thermal camera image of a periphery of the LED substrates 3 in the active energy irradiation device 1. FIG. 14 is an image of the lower wall 2*b* of the housing 2 when viewed from below. As illustrated in FIG. 14, in the active energy irradiation device 1, it can be confirmed that the temperature profile of the plurality of LED substrates 3 (plurality of LED elements 32 (refer to FIG. 3)) can be made uniform through cooling. Incidentally, in the illustrated example, the temperature distribution of the plurality of LED substrates 3 can be made uniform with a temperature gradient within 2° C.

As described above, in the active energy irradiation device 1, the inert gas outside the housing 2 can be recovered (namely, suctioned and exhausted from the exhaust unit 6 to the outside) using the flow of air inside the housing 2. The need for a separate configuration for recovering the inert gas can be suppressed. Therefore, the inert gas can be recovered while suppressing an increase in the size of the device. The inert gas supplied from the inert gas supply unit 8 can be efficiently recovered before spreading out.

The active energy irradiation device 1 includes the heatsink 4 housed inside the housing 2, and the air flow path and the inert gas flow path pass through the heatsink 4. In this case, the heatsink 4 can radiate heat using not only the air but also the inert gas.

The active energy irradiation device 1 includes the duct 7 allowing the air and the inert gas, which have passed through the heatsink 4, to flow through to the exhaust unit 6. The end portions on the heatsink 4 side of the duct 7 are inserted into the grooves 47 formed in the heat radiation fins 42 of the heatsink 4. In this case, the duct 7 enables the air and the inert gas to efficiently flow through from the heatsink 4 to the exhaust unit 6. In addition, since the end portions of the duct 7 are inserted into the grooves 47 of the heat radiation fins 42, the need for a seal member such as a packing at a connection between the duct 7 and the heat radiation fins 42 can be eliminated.

In the active energy irradiation device 1, the inert gas suction unit 9 is a structure attached to the housing 2. In this case, for example, the inert gas suction unit 9 can be attached to the housing 2 as one unit.

In the active energy irradiation device 1, the inert gas suction unit 9 includes the suction ports 92 that suction the inert gas, and the recovery flow path 93 allowing the inert gas to flow through from the suction ports 92 into the housing 2. In this case, in the inert gas suction unit 9, the inert gas is suctioned from the suction ports 92, and the recovery flow path 93 enables the inert gas to flow through into the housing 2.

The active energy irradiation device 1 includes the inert gas supply unit 8 that supplies the inert gas to the outside of the housing 2. The suction ports 92 are provided at the end portion of the inert gas suction unit 9 on the side away from the inert gas supply unit 8. In this case, the inert gas suction unit 9 can suction the inert gas at a position spaced apart from the inert gas supply unit 8. Compared to a case where the inert gas is suctioned at a position close to the inert gas supply unit 8, for example, the flow speed of the inert gas can be lowered, and the inert gas can be reliably suctioned.

In the active energy irradiation device 1, the recovery flow path 93 allows the inert gas to flow through to the side toward the inert gas supply unit 8. In this case, the recovery flow path 93 enables the inert gas to flow through and turn, and the direct entry of foreign matter such as ink mist (hereinafter, referred to as "ink mist and the like"), which is contained in the inert gas, into the housing 2 can be suppressed by the turning.

In the active energy irradiation device 1, the recovery flow path 93 includes the filter 94 that captures at least ink mist contained in the inert gas. In this case, the entry of ink mist and the like, which are contained in the inert gas, into the housing 2 can be suppressed by the filter 94.

In the active energy irradiation device 1, the recovery flow path 93 includes the shielding plate 95 that shields at least ink mist contained in the inert gas. In this case, the entry of ink mist and the like, which are contained in the inert gas, into the housing 2 can be suppressed by the shielding plate 95.

In the active energy irradiation device 1, the recovery flow path 93 includes the ink trap 96 that accumulates the ink W formed by the liquefaction of ink mist contained in the inert gas. In this case, the ink W can be accumulated in the recovery flow path 93.

In the active energy irradiation device 1, the inert gas suction unit 9 is detachably attached to the housing 2. Accordingly, the replacement and maintenance of the inert gas suction unit 9 can be easily performed. For example, the removal of the ink W accumulated in the ink trap 96 can be easily performed.

In the active energy irradiation device 1, the LED elements 32 perform irradiation with ultraviolet rays. Accordingly, the active energy irradiation device 1 can be used as a device that performs irradiation with ultraviolet rays.

Figure 15:
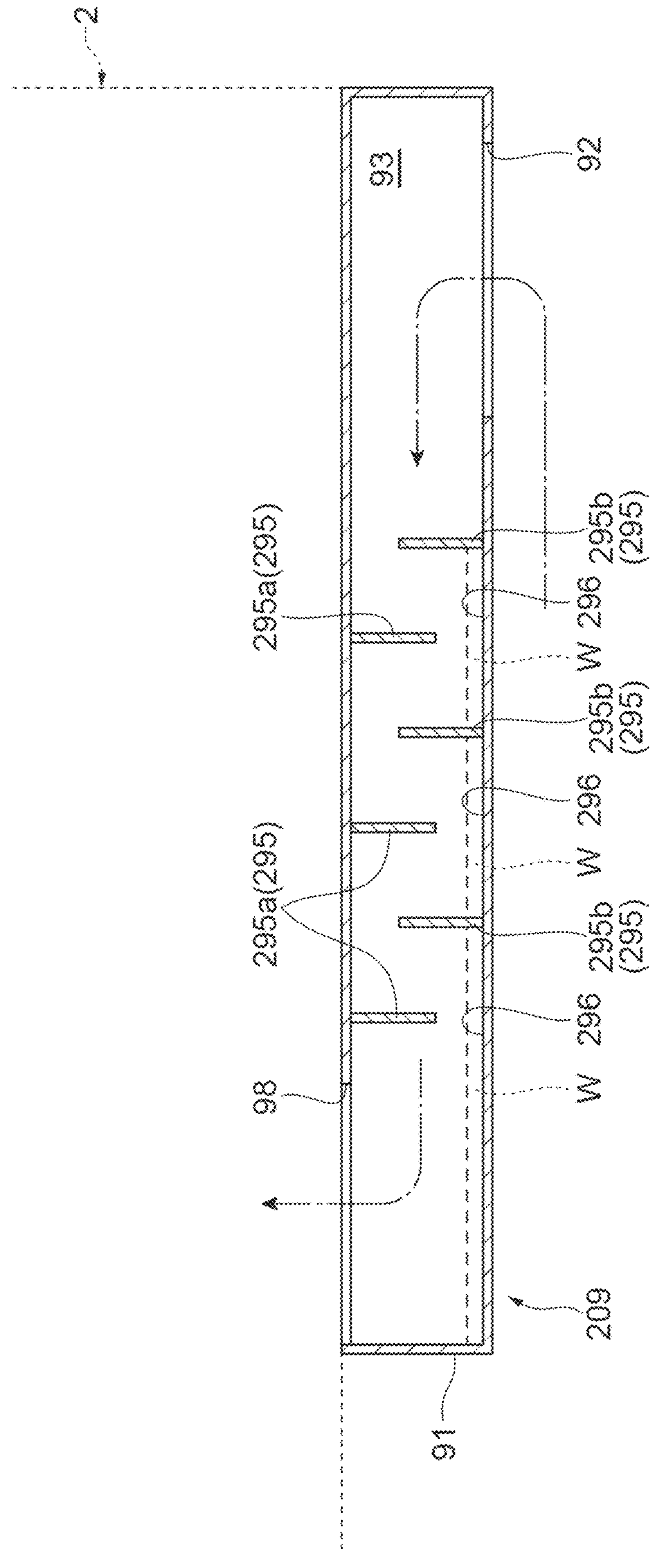
FIG. 15 is a cross-sectional view of an inert gas suction unit according to a modification example.

FIG. 15 is a cross-sectional view of an inert gas suction unit 209 according to a modification example. As illustrated in FIG. 15, the inert gas suction unit 209 is different from the inert gas suction unit 9 described above (refer to FIG. 13) in that the recovery flow path 93 includes a shielding plate 295 and an ink trap 296.

The shielding plate 295 shields at least ink mist contained in the inert gas. The shielding plate 295 is erected inside the suction unit housing 91. The shielding plate 295 is a flat plate-shaped member with the Y direction as a thickness direction. The shielding plate 295 has a surface intersecting the flow-through direction of the recovery flow path 93. The shielding plate 295 includes shielding plates **295*a* extending to protrude downward from the inner surface of the suction unit housing 91, and shielding plates 295*b* extending to protrude upward from the inner surface of the suction unit housing 91. The shielding plates 295*a* and the shielding plates 295*b* are disposed in the recovery flow path 93 so as to be alternately arranged in the Y direction. The ink trap 296 accumulates the ink W formed by the liquefaction of ink mist contained in the inert gas. The ink trap 296 is a portion having a function of blocking a certain amount of the ink W. The ink trap 296 is defined by inner surfaces of the shielding plates 295*b* and the suction unit housing 91**.

In the inert gas suction unit 209, the inert gas suctioned from the suction ports 92 is allowed to flow forward by the recovery flow path 93, and is introduced into the housing 2 through the introduction port 98. At this time, the inert gas flows between the shielding plates **295*a* and the shielding plates 295*b* in a meandering manner, and ink mist in the inert gas comes into contact with the shielding plate 295, and accumulates in the ink trap 296 at a lower portion of the shielding plate 295** as the ink W.

One mode of the present disclosure is not limited to the embodiment.

In the embodiment, the lower ends of the partition plates 44 of the heatsink 4 are spaced apart from the base plate 41; however, the configuration is not limited as long as the configuration allows more air to pass through in the X direction between the plurality of heat radiation fins 42 on the base plate 41 side than on the side opposite to the base plate 41 side, and the configuration may be as follows.

For example, a ventilation portion (for example, a hole, a mesh portion, or the like) allowing the air to pass through may be provided on the base plate 41 side in the partition plate 44. In this case, the ventilation portion can be used as a space through which the air passes. The configuration can be specifically realized in which more air passes through in the X direction between the plurality of heat radiation fins 42 on the base plate 41 side than on the side opposite to the base plate 41 side.

For example, the partition plate 44 may include a mesh portion, and the base plate 41 side of the mesh portion may have a larger opening ratio than that of the side opposite to the base plate 41 in the mesh portion. In this case, the mesh portion can be used as a space through which the air passes, and the base plate 41 side of the mesh portion can be used as a space through which more air passes. The configuration can be specifically realized in which more air passes through in the X direction between the plurality of heat radiation fins 42 on the base plate 41 side than on the side opposite to the base plate 41 side.

In the embodiment, the heatsink 4 includes the partition plates 44, but is not limited to including the partition plates 44, and may include other various partition members as long as the partition members can partition the heatsink 4. In the embodiment, the LED elements 32 as active energy irradiation units perform irradiation with ultraviolet rays; however, the active energy irradiation units may perform irradiation with electron beams. In this case, the active energy irradiation device can be used as a device that performs irradiation with electron beams.

In the embodiment, the heatsink 4 is used to radiate heat from the LED elements 32, and the LED element 32 is a heat-generating unit; however, the heat-generating unit from which the heatsink 4 has to radiate heat is not limited to the LED element 32, and may be other heat-generating units. In the embodiment, the lower end portions of the duct 7 are inserted into the grooves 47 of the heat radiation fins 42 of the heatsink 4; however, the object to be inserted into the grooves 47 is not limited to the duct 7, and may be other members. In this case, the other members can be engaged with the heat radiation fins 42 using the grooves 47.

In the embodiment, the duct 7 has a rectangular pipe shape; however, the shape of the duct 7 is not particularly limited, and may have, for example, other polygonal pipe shapes. In the embodiment, the exhaust unit 6 includes the fan 61; however, the configuration of the exhaust unit 6 is not particularly limited. For example, the exhaust unit 6 may include a pipe for discharging the air and the inert gas to the outdoors, without including the fan 61. In this case, the air and the inert gas may be delivered under pressure by a blower or the like at a connection destination on a downstream side of the pipe.

In the embodiment, an air presence region exists around the linear portion 71 and the enlarged portion 72 of the duct 7; however, the air presence region may exist around only one of the linear portion 71 and the enlarged portion 72, or the air presence region may exist around only a part of the linear portion 71 or a part of the enlarged portion 72.

In the embodiment, the inert gas suction unit 9 is detachably attached to the housing 2 by fasteners such as screws; however, the configuration for detachable attachment is not particularly limited, and a known configuration can be used. For example, the inert gas suction unit 9 may be detachably attached to the housing 2 by sliding the inert gas suction unit 9 with respect to the housing 2.

Various materials and shapes can be applied to each configuration in the embodiment and the modification examples described above without being limited to the materials and shapes described above. In addition, each configuration in the embodiment or the modification examples described above can be arbitrarily applied to each configuration in other embodiments or modification examples.

REFERENCE SIGNS LIST

1: active energy irradiation device, 2: housing, 4: heatsink, 5: intake unit, 6: exhaust unit, 7: duct, 8: inert gas supply unit, 9: inert gas suction unit, 32: LED element (active energy irradiation unit), 42: heat radiation fin, 47: groove, 92: suction port, 93: recovery flow path, 94: filter, 95, 295, 295*a*, 295*b*: shielding plate, 96, 296: ink trap, W: ink.

The invention claimed is:

1. An active energy irradiation device comprising:

a plurality of active energy irradiation units arranged at least along a predetermined direction;

a housing that houses the active energy irradiation units;

an exhaust unit that is provided in the housing, and that discharges air to an outside of the housing;

an inert gas suction unit that suctions an inert gas from the outside of the housing, the inert gas suction unit including a suction port that allows the inert gas to flow from the suction port into the housing;

an air-cooled heatsink housed inside the housing and thermally connected to the active energy irradiation units;

an air flow path including a flow path from an intake unit to the exhaust unit, the air flow path allowing the air to flow through; and an inert gas flow path including a flow path from the inert gas suction unit to the exhaust unit, the inert gas flow path allowing the inert gas to flow through, wherein the air flow path and the inert gas flow path are provided inside the housing, the air flow path and the inert gas flow path merge with each other, the air flow path and the inert gas flow path pass through the heatsink, and the exhaust unit exhausts the inert gas together with the air.

2. The active energy irradiation device according to claim 1, further comprising:

a duct provided between the heatsink and the exhaust unit inside the housing, and allowing the air, which has passed through the heatsink, to flow through to the exhaust unit, and wherein an end portion on a heatsink side of the duct is inserted into grooves formed in heat radiation fins of the heatsink.

3. The active energy irradiation device according to claim 1, wherein the inert gas suction unit is a structure attached to the housing.

4. The active energy irradiation device according to claim 1, wherein the inert gas suction unit further includes a recovery flow path allowing the inert gas to flow through from the suction port into the housing.

5. The active energy irradiation device according to claim 4, further comprising:

an inert gas supply unit that supplies the inert gas to the outside of the housing, wherein the suction port is provided at an end portion of the inert gas suction unit on a side away from the inert gas supply unit.

6. The active energy irradiation device according to claim 5, wherein the recovery flow path allows the inert gas to flow through to a side toward the inert gas supply unit.

7. The active energy irradiation device according to claim 4, wherein the recovery flow path includes a filter that captures at least ink mist contained in the inert gas.

8. The active energy irradiation device according to claim 4, wherein the recovery flow path includes a shielding plate that shields at least ink mist contained in the inert gas.

9. The active energy irradiation device according to claim 4, wherein the recovery flow path includes an ink trap that accumulates ink formed by a liquefaction of ink mist contained in the inert gas.

10. The active energy irradiation device according to claim 1, wherein the inert gas suction unit is detachably attached to the housing.

11. The active energy irradiation device according to claim 1, wherein the active energy irradiation units perform irradiation with an ultraviolet ray or an electron beam.

* * * * *